United States Patent [19]
Ito et al.

[11] Patent Number: 5,347,858
[45] Date of Patent: Sep. 20, 1994

[54] WEAR-DETECTION PROBE FOR A BRAKE LINING MATERIAL

[75] Inventors: Katsuya Ito; Fumiyoshi Tanigawa, both of Mie, Japan

[73] Assignee: Sumitomo Wiring Systems, Ltd., Yokkaichi, Japan

[21] Appl. No.: 987,456

[22] Filed: Dec. 7, 1992

[30] Foreign Application Priority Data

Dec. 12, 1991 [JP] Japan ............... 3-110023[U]

[51] Int. Cl.⁵ ................................ G01L 5/28
[52] U.S. Cl. ...................... 73/129; 340/454
[58] Field of Search ............ 73/121, 129; 340/453, 340/454

[56] References Cited

U.S. PATENT DOCUMENTS

| | | | |
|---|---|---|---|
| 4,016,533 | 4/1977 | Ishikawa et al. | 340/454 |
| 4,147,236 | 4/1979 | Steffen et al. | 340/454 |
| 4,437,547 | 3/1984 | Harmer | 340/454 |
| 4,562,421 | 12/1985 | Duffy | 340/454 |
| 4,646,001 | 2/1987 | Baldwin et al. | 340/454 |

FOREIGN PATENT DOCUMENTS

| | | |
|---|---|---|
| 0465954 | 1/1992 | European Pat. Off. . |
| 9010354 | 9/1990 | Fed. Rep. of Germany . |
| 55-149434 | 11/1980 | Japan . |
| 62-97332 | 6/1987 | Japan . |
| 2015099 | 9/1979 | United Kingdom ............ 340/454 |
| 2194824 | 3/1988 | United Kingdom . |
| 3904673 | 8/1990 | United Kingdom . |

*Primary Examiner*—Hezron E. Williams
*Assistant Examiner*—George M. Dombroske
*Attorney, Agent, or Firm*—Sughrue, Mion, Zinn, Macpeak & Seas

[57] ABSTRACT

A wear-detection probe for a brake lining material comprises: a detection conductor which extends a given length toward the rotor from the side of the brake lining material facing away from the rotor; a probe body housing supporting the detection conductor; a probe connector housing detachably connected to tile probe body housing; and a pair of terminals supported in the probe connector housing, the terminals contacting the detection conductor when the probe connector housing is connected to the probe body housing. The conductor either contacts the rotor or is cut off by the rotor when a predetermined thickness remains in the brake lining material due to wear. Since it is possible to exchange probes without exchanging harnesses, the cost for replacing the probe is greatly reduced.

1 Claim, 7 Drawing Sheets

WEAR-DETECTION PROBE FOR A BRAKE LINING MATERIAL

BACKGROUND OF THE INVENTION:

1. Field of the Invention

This invention relates to a wear-detection probe for a brake lining material in a vehicle such as a motorcar.

2. Statement of the Prior Art

A brake for a vehicle generates a braking force by pressing a lining material, such as a shoe lining in a drum brake or a brake pad in a disc brake, on a rotor. It is possible to improve the safety of the brake by detecting the amount of wear of the lining material and generating a warning signal before the lining material has been overworn.

As means for detecting the usable limit of brake lining material with respect to wear, there is a known contact type or disconnection type wear-detection device which has a probe provided in or near the brake lining material with a conductor which is either contacted with the rotor or cut off by the rotor when the brake lining material is worn by a predetermined amount, and which turns on a warning light to indicate the wear of the lining material when the conductor is either contacted with the rotor or cut off by the rotor.

For convenience of explanation, a conventional wear-detection probe for brake lining material will be described below by referring to FIGS. 16 and 17.

FIG. 16 shows a probe 100 in a disconnection type wear-detection device, which comprises a detection part 101 having a loop-like circuit conductor B connected to a controller A and a housing 102 made of a resin material for receiving the detection part 101. The probe 100 is secured to a back metal D of the brake lining material C with the detection part 101 being inserted into the brake lining material C. In the probe 100 shown in FIG. 16, the detection part 101 is cut off by a rotor (not shown), when the brake lining material C is worn by a given amount.

FIG. 17 shows a probe 200 in a contact type wear-detection device. The probe 200 comprises a detection part 201 on an end of a circuit conductor B' connected to a controller A' and a housing 202 supporting the detection part 201. The probe 200 shown in FIG. 17 is secured to the back metal D of the brake lining material C with the detection part being inserted into the material C. In the probe 200 in FIG. 17, the detection part 201 contacts with the rotor R which rotates by wheels and then conducts the electric current in the controllers when the brake lining material C is worn by a given amount.

The above wear-detection of the brake lining material in the disconnection type or contact type wear-detection device is accompanied by breakage of the probe. Accordingly, it is necessary to exchange an old probe for a new one once the probe has detected the wear of the brake lining material.

However, since the detection parts 101 and 201 in the conventional probes shown in FIGS. 16 and 17 are formed together with the circuit conductors B and B', it is necessary to change the circuit conductors B and B' which connect the probes 100 and 200 to the controllers A and A' in the wear-detection device, as well as the probes 100 and 200 once the wear-detection is completed. That is, since the harness must be changed in the conventional probe whenever the wear-detection has been completed, the costs of the parts to be prepared and changing them are increased.

SUMMARY OF THE INVENTION

An object of the present invention is to provide a wear-detection probe for a brake lining material wherein a conductor is either contacted with a rotor or cut off by the rotor when a predetermined thickness remains in the brake lining material due to wear, and wherein the exchange of harnesses is not required after the wear-detection has been completed.

In order to achieve the above object, a wear-detection probe for a brake lining material in accordance with the present invention, comprises:

a detection conductor which extends a given length toward the rotor from the side of the brake lining material facing away from the rotor;

a probe body housing supporting said detection conductor;

a probe connector housing detachably connected to said probe body housing; and a pair of terminals supported in said probe connector housing, said terminals being contacted with said detection conductor when said probe connector housing is connected to said probe body housing.

According to the wear-detection probe for brake lining material of the present invention, the steps of exchanging probes are carried out by disconnecting the probe body housing, which holds the finished detection conductor, from the probe connector housing after completing the wear-detection, and then by coupling a new probe body housing having a new probe to the probe connector housing.

DETAILED DESCRIPTION OF THE PREFERRED EMBODIMENTS

Referring now to FIGS. 1 through 15, an embodiment of a wear-detection probe for a brake lining material in accordance with the present invention will be described below.

FIGS. 1 through 9 shows a first embodiment of the probe of the present invention.

Figure 1:
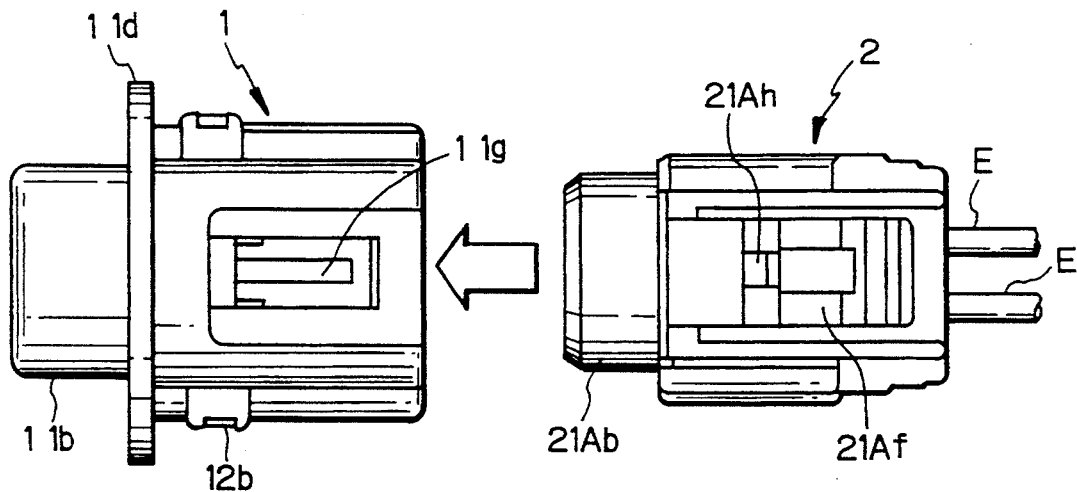
FIG. 1 is a plan view of a wear-detection probe for a brake lining material, in which a probe body is disconnected from a probe connector.
Figure 2:
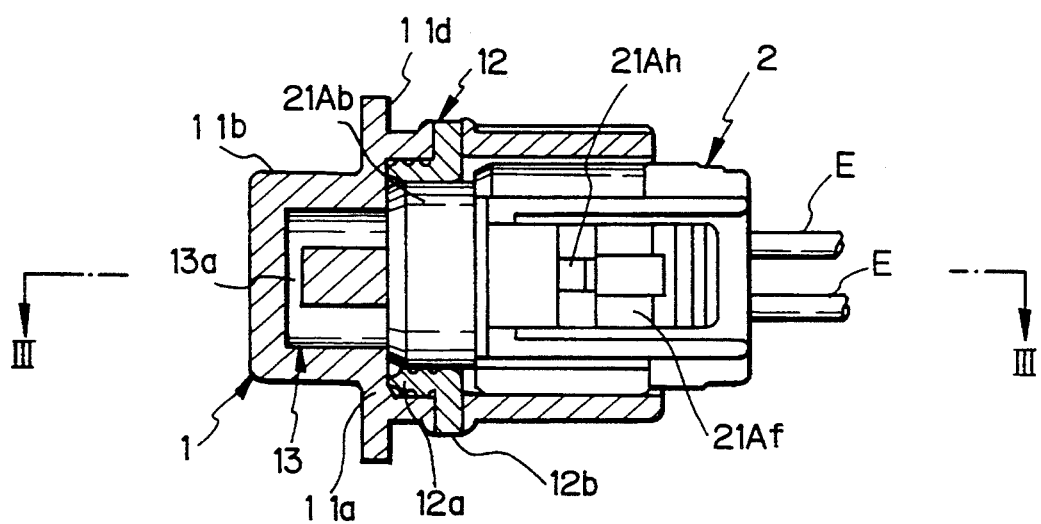
FIG. 2 is a partially broken away plan view of the wear-detection probe, in which the probe body shown in FIG. 1 is connected to the probe connector.
Figure 3:
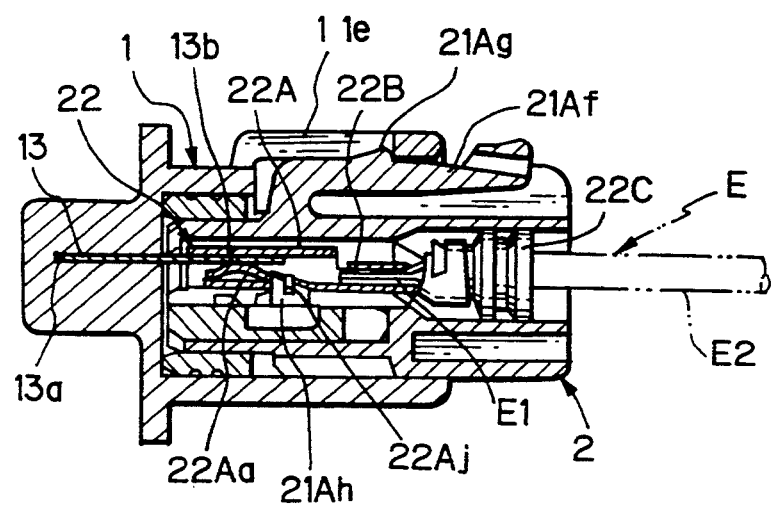
FIG. 3 is a longitudinal cross sectional view of the wear-detection probe taken along lines III—III in FIG. 2.

The wear-detection probe for a brake lining material (hereinafter referred to as a "probe") in the embodiment shown in FIGS. 1 through 3 is disconnection type probe and comprises a probe body 1 and a probe connector 2. Tile probe body 1 and the probe connector 2 constitute a male connector and a female connector, respectively, so that they can be detachably interconnected.

Figure 4:
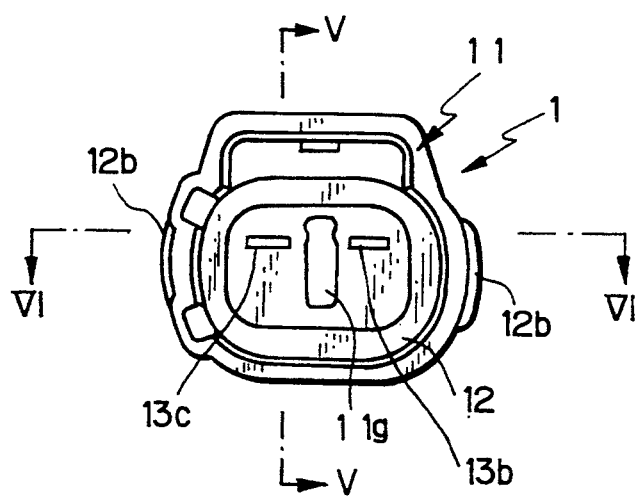
FIG. 4 is a rear side view of the probe body shown in FIG. 1.
Figure 5:
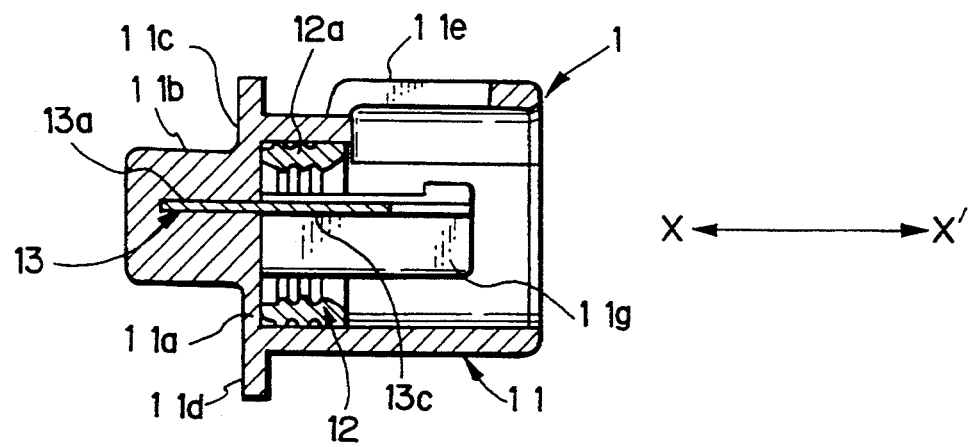
FIG. 5 is a cross-sectional view of the probe body taken along lines V—V in FIG. 4.
Figure 6:
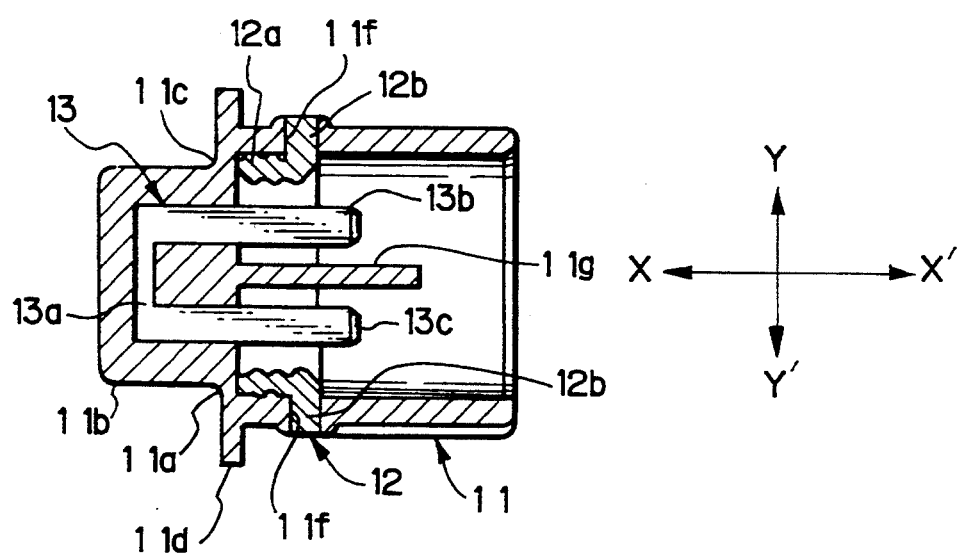
FIG. 6 is a cross-sectional view of the probe body taken along lines VI—VI in FIG. 4.

The probe body 1, as shown in FIGS. 4 through 6, comprises a housing 11, a packing 12, and a detection conductor 13.

The housing 11 is made of a hard resin material and formed into a substantially cylindrical body with an open end. The housing 11 is provided with an insertion portion 11b at a closing end wall 11a. The insertion portion 11b has a substantially rectangular cross section and extends outwardly from the housing 11. An abutment face 11c is Formed on the outer face of the closing end wall 11a on which the insertion portion 11b stands. The housing 11 has a flange lid which extends outwardly from the outer periphery of the housing 11 and continues to the abutment face 11c. As shown in FIG. 5, the housing 11 is provided at an upper wall with an opening 11e which engages with a projection 21Ag (see FIG. 7) on the probe connector 2.

As shown in FIG. 6, the housing 11 is provided at the opposite side walls and at the position displaced from the opening 11e in the direction X with engaging holes 11f which engage with the packing 12. The housing 11 is further provided with a partition 11g extending laterally (in tile direction Y—Y') in the interior of the housing.

The packing 12 is made of a soft elastic material such as rubber and comprises a cylindrical body 12a with open opposite ends and a pair of ears 12b projecting outwardly on an end of the cylindrical body 12a. The cylindrical body 12a is provided with a plurality of peripheral grooves on the interior and exterior faces of the body along the axis thereof. These peripheral grooves define a water-proof portion on the interior and exterior faces of the body 12a. The pair of ears 12b engage with the engaging holes 11f in the opposite sides of the housing 11. This engagement of the ears 12b in the holes 11f serves to hold the packing 12 at a position adjacent to the closing end wall 11a on the housing 11.

The detection conductor 13 is made of a flat metal piece and formed into a U-shape. A bent portion 13a of the detection conductor 13 is embedded in the insertion portion 11b of the housing 11. The ends of the bent portion 13a extend to an end of the housing 11 (in the direction X'). The detection conductor 13 has contact portions 13b and 13c at both ends. The contact portions 13b and 13c are disposed on both sides of the partition 11g in the housing 11.

Figure 7:
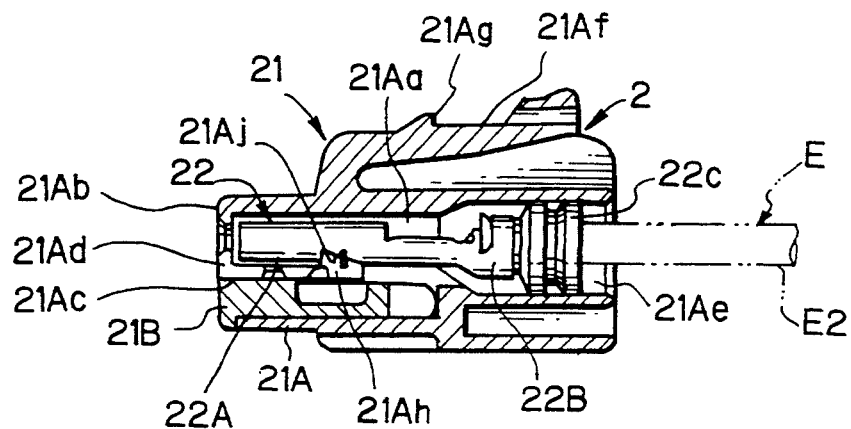
FIG. 7 is a longitudinal cross sectional view of the probe connector shown in FIG. 1.
Figure 8:
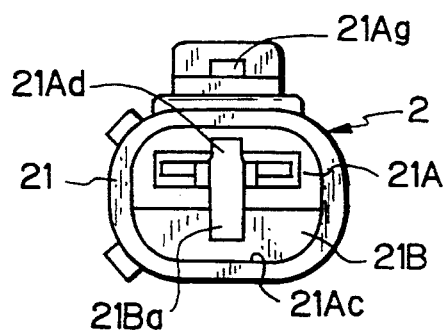
FIG. 8 is a front side view of the probe connector shown in FIG. 1.

The probe connector 2, as shown in FIG. 7, has a housing 21 and a pair of terminals 22 (one of the terminals 22 is shown in FIG. 7).

The housing 21 is made of the same hard resin material as that of the housing 11 of the probe 1 and comprises a housing body 21A and an engaging piece supporting member 21B.

The housing body 21A has a shape suitable for insertion into the housing 11 of the probe body 1. The housing body 21A has a pair of spaces 21An (one of the spaces 21Aa is shown in FIG. 7) for receiving the respective pair of terminals 22. The housing body 21A is provided with a projection 21Ab having a larger outer diameter than the inner diameter of the packing 12 at the top end. A mounting hole 21Ac for mounting the engaging piece supporting member 21B (see FIG. 7) is formed in a lower end portion of the projection 21Ab.

The projection 21Ab is provided at the upper portion of the end face with an insertion hole 21Ad for receiving the upper portion of the partition 11g and the contact portions 13b and 13c on the probe body 1. Also, the housing body 21A is provided at the rear end face with an insertion hole 21Ae for receiving the pair of terminals 22. Further, the housing body 21A is provided at the upper face with an elastic piece 21Af extending from the front side toward the rear side. The elastic piece 21Af has a projection 21Ag at a given position on the upper face thereof.

In addition, a latch piece 21Ah is formed in the space 21Aa so that the latch piece 21Ah can be deflected down by the terminals 22 when the terminals 22 are inserted into the space 21An. The latch piece 21Ah can return to the upper normal position when the pushing force of the terminals 22 is released. The latch piece 21Ah at the normal position mates with a recess 22Aj on tile terminals 22.

The engaging piece supporting member 21B is fixed in the housing body 21A by inserting it into the mounting hole 21Ac after inserting the terminals 22 into the given position in the housing body 21A. The engaging piece supporting member 21B is prevented from moving below the latch piece 21Ah of the housing body 21 when the member 21B is received in the mounting hole 21Ac. The engaging piece supporting member 21B is also provided with an opening 21Ba into which the lower portion of the partition 11g of the probe body 1 is inserted.

The terminals have a detection conductor contact portion 22A and an electrical wire connection portion 22B which are integrally made of a metal strip.

The detection conductor contact portion 22A is formed into a cylindrical shape and is provided in the interior with a protrusion 22Aa by cutting and bending the peripheral wall of the portion 22A as shown in FIG. 3. The protrusion 22Aa elastically contacts with the contact portions 13b and 13c of the detection conductor 13 inserted in the detection conductor contact portion 22A. The portion 22A is provided with a recess 22Aj at the position corresponding to the latch piece 21Ah of the housing body 21 when the terminal 22 are inserted into the given position in the housing body 21. The recess 22Aj is formed together with a so-called lance (not shown) by punching the outer wall of the contact portion 22A inwardly which leaving a part thereof.

An electrical wire E which connects the probe connector 2 to a controller (not shown) of the wear-detection device is connected to the electrical wire connection portion 22B through a rubber packing 22C for water-proofing. The cover E2 on an end of the electrical wire E is removed to expose a conductor E1 (see FIG. 3). The inner periphery of the rubber packing 22C closely contacts with the end of the cover 2E, while the outer periphery of the packing 22C closely contacts with the inner wall of the housing body 21A. An end of the connection portion 22B is pressed on the electrical wire E through the rubber packing 22C. The connection portion 22B, with exception of the above pressed end, is pressed on the exposed conductor E1 at the end of the electrical wire E.

Figure 9:
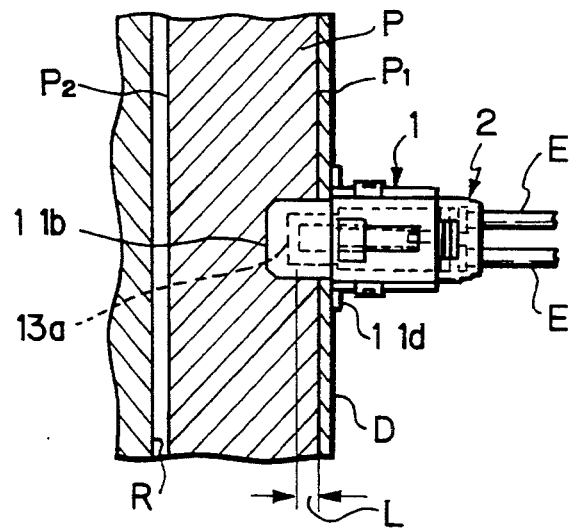
FIG. 9 is an explanatory view illustrating the wear-detection probe for a brake lining material shown in FIG. 1, which is in use.

FIG. 9 shows the above probe which is mounted on a disc type brake device for a motorcar. This mounting process is carried out as follows.

First, the flange 11d is secured to the back metal D of a brake pad P by screws and the like with the insertion portion 11b of the housing 11 of the probe body 1 being disposed in the brake pad P. The bent portion 13a of the detection conductor 13 is disposed at a position a given length L from a face P1 opposite the rotor R toward a face P2 contacting with the rotor R in the brake pad P. The length L is set in accordance with a wear limit of the brake pad P. It will be apparent from the foregoing that the length L can be changed by adjusting the set position of the detection conductor 13 with respect to the housing 11.

Second, the probe body 1 is connected to the probe connector 2 in which the terminals 22 are connected to the electrical wire E. This connection is accomplished by inserting the housing 21 of the probe connector 2 into the housing 11 of the probe body 1, with tile elastic piece 21Af formed on the housing body 21A of the probe connector 2 being deflected downwards by an external force. The projection 21Ag engages with the rear peripheral edge of the opening 11e so that the housing 21 is prevented from disconnecting from the housing 11 if the external force is released from the elastic piece 21Af at the time when the projection 21Ag formed on the elastic piece 21Af of tile housing body 21A reaches the position corresponding to the opening 11e in the housing 11. The contact portions 13b and 13c on the detection conductor 13 in the probe body 1 and the partition 11g in the housing 11 move into tile housing 21 through the insertion hole 21Ad and the opening 21Ba in the housing 21 while the housing 21 is being inserted into the housing 11. The contact portions 13b and 13c which have moved in the housing 21 further move into the detection conductor contact portion 22A.

Thus, the detection conductor 13 is electrically connected to the terminals 22 by elastically contacting the protrusion 22Aa in the detection conductor contact portion 22A with the contact portions 13b and 13c inserted in the portion 22A.

In the above probe mounted on the brake device for a motorcar, the bent portion 13a of the detection conductor 13 contacts with the rotor and is cut off when the remaining thickness of the brake pad P becomes smaller than the predetermined length L by the wear caused by the contact of the brake pad P and the rotor R. Accordingly, it is possible to detect the given wear of the brake pad P by connecting the electrical wire E to the controller in the wear-detection device which operates in response to the disconnection of the detection conductor 13.

When the wear limit of the brake pad P is detected by the probe, the probe body 1 breaks and cannot be used again. In the probe of this invention, only the probe body 1 is broken by the detection of wear, and the probe connector 2 connected to the electrical wire E is not broken at all.

Accordingly, the work of exchanging probes can be accomplished without handling the harness, including the electrical wire E connected to the probe connector 2, by disconnecting the probe connector 2 from the probe body 1 after detecting the wear limit, exchanging the broken probe body 1 secured to the back metal D of the brake pad P for a new probe body 1, and then reconnecting the probe connector 2 to the new probe body 1. The work of disconnecting the probe connector 2 from the probe body 1 can be easily carried out by deflecting down the elastic piece 21Af of the probe connector 1 by external force, releasing the projection 21Ag from the opening 11e, and drawing the probe connector 2 from the probe body 1.

Figure 10:
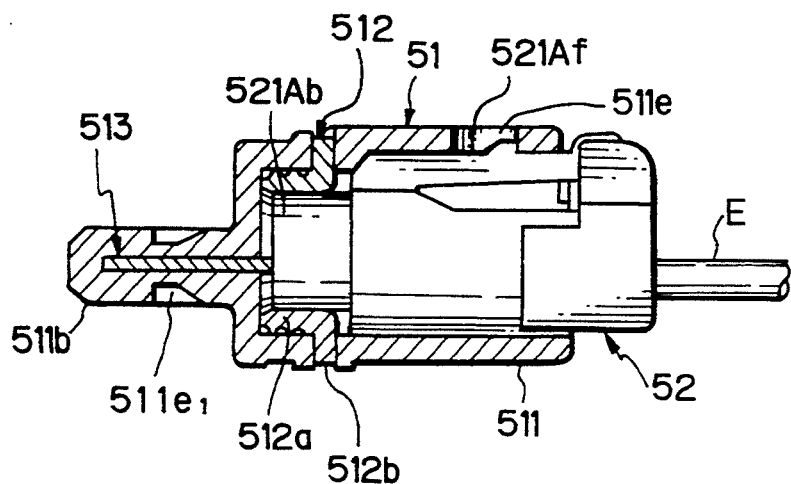
FIG. 10 is a partially broken away side view of another wear-detection probe for a brake lining material in accordance with the present invention.
Figure 11:
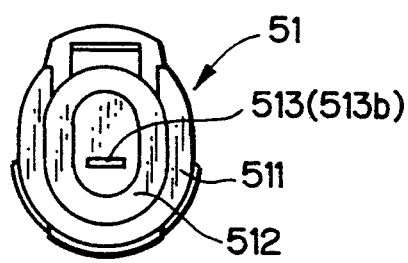
FIG. 11 is a rear side view of the probe body of the probe shown in FIG. 10.

A second embodiment of the probe of the present invention will be explained below by referring to FIGS. 10 through 15. FIG. 10 shows another wear-detection probe for a brake lining material of the present invention. The probe shown in FIG. 10 is a contact type probe and comprises a probe body 51 and a probe connector 52.

The probe connector 52 is substantially the same as the probe connector 2 of the probe in the above embodiment except for a single terminal to be mounted (not shown). Accordingly, elements in the probe connector 52 which correspond to the elements in the probe connector 2 are indicated in FIG. 10 by adding the numeral "5" to the left of the numbers in the probe connector, and thus a detailed explanation is omitted.

The probe body 51 is also substantially the same as the probe body 1, except that the detection conductor 513 and means for attaching the probe to the back metal of the brake pad are different from the detection conductor 13 and the flange attaching means. Accordingly, only the detection conductor 513 and the said attaching means are described below by referring to FIGS. 11 to 13. Elements in the probe body 51 which correspond to the elements in the probe body 1 are indicated in FIGS. 10 to 13 by adding the numeral "5" to the left of the numbers in the probe body, and thus a detailed explanation is omitted.

Figure 12:
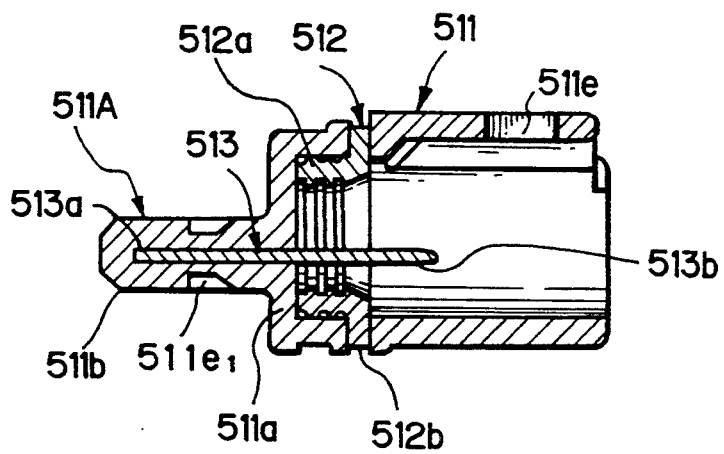
FIG. 12 is a longitudinal cross sectional view of the probe body shown in FIG. 11.
Figure 13:
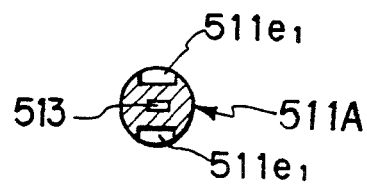
FIG. 13 is a cross-sectional view of a main portion of the probe body shown in FIG. 12.

The housing 511 of the probe body 51 has a cylindrical projection 511A on a closing end wall 511a. The top end of the projection 511A constitutes the insertion portion 511b of the housing 511. As shown in FIGS. 12 and 13, a recess 511e1 is formed in the projection 511A at a position adjacent to the insertion portion 511b. An inner peripheral edge portion of a washer 511e2 (see FIG. 14) separated from the housing 511 is fitted on the recess 511e1.

The detection conductor 513 of the probe body 51 is made of a metal plate having a rectangular cross section. The detection conductor 513 is embedded in the projection 511A at the top end 513a with the end being disposed at a given position in the insertion portion 511a. A rear end 513b of the detection conductor 513 projects in the space in the housing 511. The rear end 513b forms a contact portion for the terminal (not shown) supported in the probe connector 52.

Figure 14:
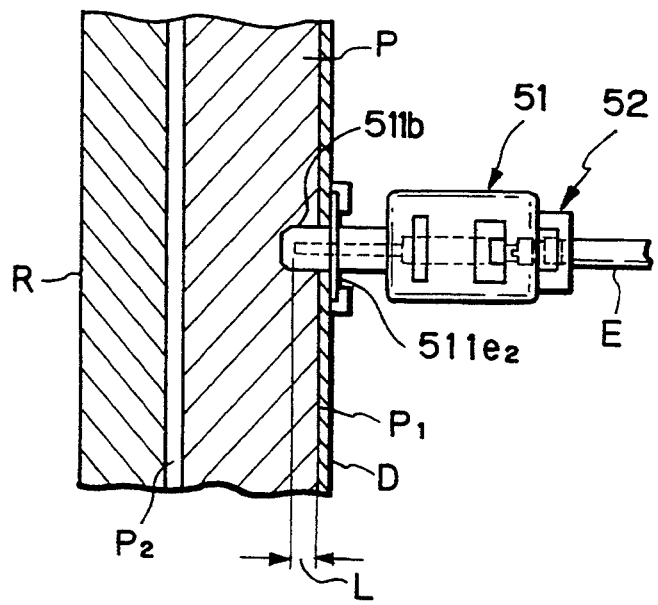
FIG. 14 is an explanatory view illustrating the wear-detection probe for a brake lining material shown in FIG. 10, which is in use.

As shown in FIG. 14, the probe body 51 of the probe shown in FIG. 10 is mounted on the brake device for a motorcar through the washer 511e2. The washer 511e2 is secured to the back metal D of the brake pad P by screws, with the inner peripheral edge being fitted on the recess 511e1 in the projection 511A of the probe body 51 and the insertion portion 511b of the housing 511 being disposed in the brake pad P. The top end of the detection conductor 513 is disposed at a position a given length L from the face P1 opposite the rotor R toward the face P2 contacting with the rotor R, similarly to the bent portion 13a of the detection conductor 13 in the first embodiment.

Since the process for coupling the probe connector 52 to the probe body 51 mounted on the back metal D is the same as that in the first embodiment, the explanation of the process is omitted.

In the probe shown in FIGS. 10 through 14, the detection conductor 513 contacts with the rotor upon braking when the brake pad P is worn by a given amount. Accordingly, it is possible to detect the wear limit of the brake pad P by connecting one of the wear-detection terminals of the wear-detection device to the rotor R and connecting the other terminal to the terminal (not shown) of the probe connector 52.

In the probe shown in FIGS. 10 through 14, the work of exchanging probes can be accomplished without exchanging harnesses, containing the electrical wire E connected to the probe connector 52, by disconnecting the probe connector 52 from the probe body 51 after detecting the wear, exchanging the broken probe body 51 for a new probe body, and then connecting the probe connector 52 to the new probe body 51.

Figure 15:
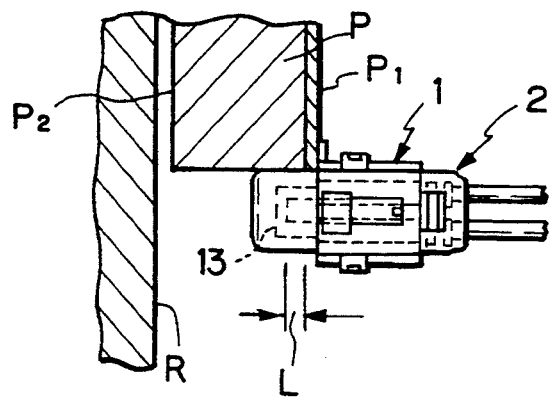
FIG. 15 is an explanatory view illustrating the wear-detection probe for a brake lining material shown in FIG. 1, which is in another state of use.
Figure 16:
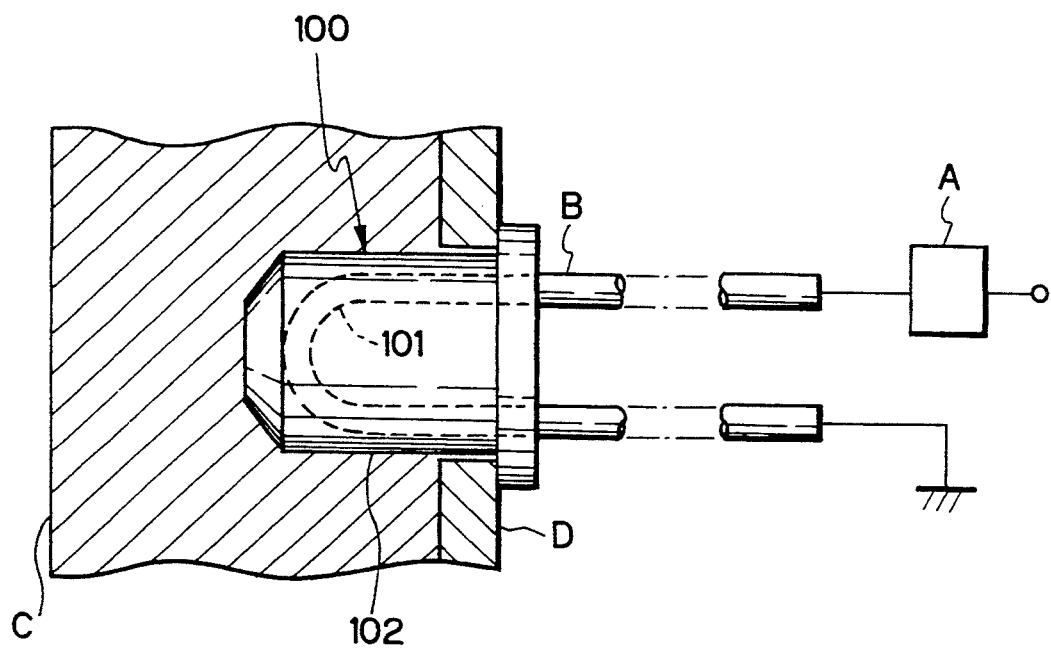
FIG. 16 is an explanatory view of a conventional wear-detection probe for a brake lining material.
Figure 17:
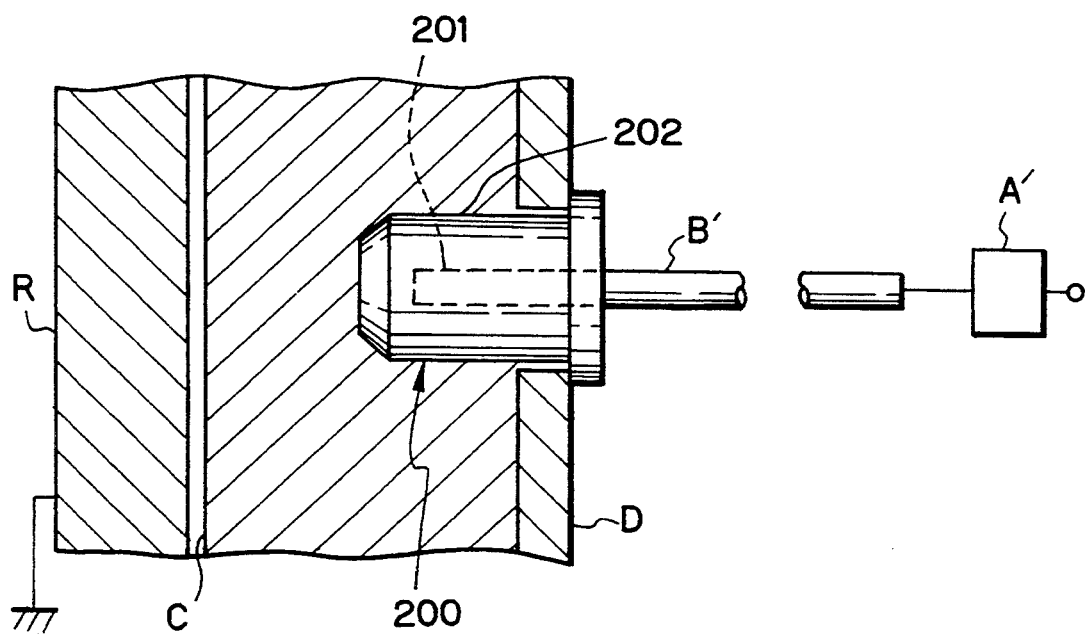
FIG. 17 is an explanatory view of another conventional wear-detection probe for a brake lining material.

Although the probes are mounted on the brake pad P and the insertion portions 11a and 511a are disposed in the brake pad P in the above embodiments, the probe may be disposed adjacent to the brake pad P, as shown in FIG. 15. FIG. 15 shows that the probe shown in FIGS. 1 through 9 is mounted outside the brake pad P. In this supporting construction of the probe, the top end of the detection conductor 13 and 513 is disposed at a position a given length L from the face P1 opposite the rotor R toward the face P2 contacting with the rotor R.

Although the probes are directed to the brake pad of a disc brake in the above embodiments, the probe of this invention can also be applied to detect wear of a shoe lining material of a drum brake.

According to the wear-detection probe for a brake lining material of the present invention, it is possible to significantly reduce the cost for exchanging probes, since the broken probe can be replaced without changing the harness containing the electrical wire connected to the probe.

What is claimed is:

1. A wear-detection probe for a brake lining material wherein a conductor is either contacted with a rotor or cut off by a rotor when a predetermined thickness remains in the brake lining material due to wear, comprising:

a thin, flat plate detection conductor which extends a given length toward the rotor from a side of the brake lining material facing away from the rotor;

a probe body housing supporting said detection conductor and including an insertion portion, whereby only said insertion portion is embedded in the brake lining material;

a probe connector housing detachably connected to said probe body housing; and a pair of terminals supported in said probe connector housing, said terminals being contacted with said detection conductor when said probe connector housing is connected to said probe body housing.

* * * * *